United States Patent
Takeda (10) Patent No.: US 10,666,168 B2
(45) Date of Patent: May 26, 2020

(54) ELECTRIC TOOL

(71) Applicant: HITACHI KOKI CO., LTD., Tokyo (JP)

(72) Inventor: Yuuki Takeda, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 204 days.

(21) Appl. No.: 15/529,512

(22) PCT Filed: Oct. 30, 2015

(86) PCT No.: PCT/JP2015/080792
§ 371 (c)(1),
(2) Date: May 25, 2017

(87) PCT Pub. No.: WO2016/084553
PCT Pub. Date: Jun. 2, 2016

(65) Prior Publication Data
US 2017/0264219 A1   Sep. 14, 2017

(30) Foreign Application Priority Data
Nov. 28, 2014   (JP) .................................. 2014-240986

(51) Int. Cl.
*H02P 3/18*   (2006.01)
*H02P 6/17*   (2016.01)
(Continued)

(52) U.S. Cl.
CPC .............. *H02P 3/18* (2013.01); *B24B 23/028* (2013.01); *B25F 5/00* (2013.01); *H02P 6/17* (2016.02); *H02P 27/08* (2013.01)

(58) Field of Classification Search
CPC ......... B25B 21/00; B25B 21/02; B25B 23/00; B25B 23/14; B25B 23/141; B25B 23/147;
(Continued)

(56) References Cited

U.S. PATENT DOCUMENTS 4,267,914 A * 5/1981 Saar ...................... B23Q 11/04
192/147
4,422,239 A   12/1983 Maier et al.
(Continued)

FOREIGN PATENT DOCUMENTS

EP   2520397   11/2012
JP   S51-096020   8/1976
(Continued)

OTHER PUBLICATIONS

"Search Report of Europe Counterpart Application", dated Jul. 9, 2018, p. 1-p. 7.
(Continued)

*Primary Examiner* — Hemant Desai
*Assistant Examiner* — Jacob A Smith
(74) *Attorney, Agent, or Firm* — JCIPRNET (57) ABSTRACT

Provided is an easy-to-use electric tool with which braking force can be changed according to work conditions. When an operation switch 5 is turned off, a control unit 50 detects a rotation rate R1 of an electric motor 6. The control unit 50 stands by for a prescribed period, detects a rotation rate R2 of the electric motor 6, and calculates the difference between the rotation rates R1, R2 (R=R1−R2). Since the rotation rate difference R corresponds to the rate of change in rotation rate with time during deceleration of the electric motor 6 and is smaller the larger the moment of inertia of the attached rotary tool, the control unit 50 can determine the moment of inertia of the rotary tool on the basis of the rotation rate difference R. The control unit 50 sets the braking force according to the moment of inertia and performs braking.

21 Claims, 7 Drawing Sheets (51) Int. Cl.
  *H02P 27/08* (2006.01)
  *B24B 23/02* (2006.01)
  *B25F 5/00* (2006.01)

(58) Field of Classification Search
  CPC .......... B25B 23/1475; B25F 5/00; B25F 3/00;
  B25F 5/02; B25F 5/021; B27G 19/02;
  B23D 59/007; B23D 47/08; B23D 47/10;
  B23D 45/044; B23D 45/048; B23D
  47/02; B23D 47/025; B23D 47/126;
  B23D 59/001; B23D 59/003; B23D
  59/006; B24B 23/00; B24B 23/02; B24B
  45/00; B23B 45/00; H02P 3/22; H02P
  6/24; H02P 6/16
  USPC .............................. 173/2, 5, 6, 176, 181, 217
  See application file for complete search history.

(56) References Cited

U.S. PATENT DOCUMENTS

| | | | | |
|---|---|---|---|---|
| 4,450,397 | A | | 5/1984 | Painter et al. |
| 4,830,550 | A * | | 5/1989 | Carlson ................. B23B 45/003 408/102 |
| 5,285,857 | A * | | 2/1994 | Shimada ................. B25B 23/14 173/1 |
| 5,984,020 | A * | | 11/1999 | Meyer .................... B23D 45/16 173/171 |
| 6,092,610 | A * | | 7/2000 | Kosmala .................... E21B 4/20 175/61 |
| 6,094,023 | A | | 7/2000 | Ericsson |
| 7,980,320 | B2 * | | 7/2011 | Inagaki ................... B25F 5/001 173/11 |
| 8,466,641 | B2 * | | 6/2013 | Kaufmann ............. B25F 5/001 318/379 |
| 8,579,041 | B2 * | | 11/2013 | Pellenc ................. B27B 17/083 173/2 |
| 8,833,221 | B2 * | | 9/2014 | Tomita .................. B27G 19/003 83/788 |
| 2004/0231870 | A1 * | | 11/2004 | McCormick ............. B25B 5/12 173/217 |
| 2006/0081386 | A1 * | | 4/2006 | Zhang .................. B23D 59/001 173/2 |
| 2009/0096401 | A1 * | | 4/2009 | Watabe .................... B25F 5/00 318/446 |
| 2009/0308628 | A1 * | | 12/2009 | Totsu ..................... B25B 21/00 173/176 |
| 2010/0194315 | A1 | | 8/2010 | Kusakawa et al. |
| 2011/0007436 | A1 * | | 1/2011 | Single ...................... B25F 5/00 361/23 |
| 2011/0284256 | A1 * | | 11/2011 | Iwata ....................... B25F 5/00 173/176 |
| 2012/0074881 | A1 * | | 3/2012 | Pant ...................... B25B 23/147 318/400.09 |
| 2012/0091932 | A1 * | | 4/2012 | Rottmerhusen ........... H02P 3/22 318/381 |
| 2012/0160529 | A1 * | | 6/2012 | Eshleman ............... B25B 21/00 173/1 |
| 2012/0191250 | A1 * | | 7/2012 | Iwata ........................ B25F 5/00 700/275 |
| 2012/0279743 | A1 * | | 11/2012 | Suda ...................... B25F 5/001 173/176 |
| 2012/0295762 | A1 * | | 11/2012 | Koike ..................... B60T 7/042 477/185 |
| 2013/0025892 | A1 * | | 1/2013 | Mashiko ................. B25B 21/02 173/2 |
| 2013/0049665 | A1 * | | 2/2013 | Oyobe ...................... H02P 3/22 318/489 |
| 2013/0284551 | A1 * | | 10/2013 | Nadig ................ B23Q 11/0092 188/267 |
| 2013/0288581 | A1 * | | 10/2013 | Esenwein ............. B24B 23/028 451/363 |
| 2013/0297134 | A1 * | | 11/2013 | Saito ........................ B60L 7/18 701/22 |
| 2014/0056660 | A1 * | | 2/2014 | Eshleman ............... B25B 21/00 408/9 |
| 2014/0102742 | A1 * | | 4/2014 | Eshleman ............. B25B 21/004 173/183 |
| 2015/0021062 | A1 * | | 1/2015 | Sekino ................... B25B 21/007 173/183 |

FOREIGN PATENT DOCUMENTS

| | | |
|---|---|---|
| JP | S59-028297 | 2/1984 |
| JP | H02-048182 | 2/1990 |
| JP | H03-206931 | 9/1991 |
| JP | H0866074 | 3/1996 |
| JP | 2003079989 | 3/2003 |
| JP | 2005-176454 | 6/2005 |
| JP | 2007-275999 | 10/2007 |
| JP | 2007-301703 | 11/2007 |
| JP | 2011-005588 | 1/2011 |
| JP | 2011-079075 | 4/2011 |
| JP | 2011-136399 | 7/2011 |
| JP | 2013215831 | 10/2013 |
| WO | 2012164238 | 12/2012 |

OTHER PUBLICATIONS

"International Search Report (Form PCT/ISA/210) of PCT/JP2015/080792", dated Dec. 8, 2015, with English translation thereof, pp. 1-4.

"Office Action of China Counterpart Application," dated Jan. 25, 2019, with English translation thereof, p. 1-p. 13.

"Search Report of Europe Counterpart Application", dated Nov. 12, 2019, p. 1-p. 7.

* cited by examiner

| | | | example 1 | example 2 | example 3 |
|---|---|---|---|---|---|
| rotation number difference R $(R_1-R_2)$rpm | Inertial force of tip tool | selected braking force | duty ratio control brake | mechanical Brake + duty ratio control brake | coil brake |
| $R \leq 1000$ | large | small | duty ratio = 30% | only mechanical brake | only weak |
| $1000 < R \leq 2500$ | medium | medium | duty ratio = 50% | mechanical brake + duty ratio = 30% | only strong |
| $2500 < R$ | small | large | duty ratio = 70% | mechanical brake + duty ratio = 50% | weak + strong |

FIG. 12

ELECTRIC TOOL

CROSS-REFERENCE TO RELATED APPLICATION

This application is a 371 application of the international PCT application serial no. PCT/JP2015/080792, filed on Oct. 30, 2015, which claims the priority benefit of Japan application no. 2014-240986, filed on Nov. 28, 2014. The entirety of each of the abovementioned patent applications is hereby incorporated by reference herein and made a part of this specification.

TECHNICAL FIELD

The present invention relates to an electric tool such as a grinder with a braking function.

BACKGROUND ART

In the related art, in electric tools such as grinders, automatically performing braking (applying a brake) if manipulation switches such as triggers or the like are turned off is known. Various rotating tools such as whetstones, cutters, and brushes may be selectively attached to grinders depending on types of tasks. Since weights and outer diameters are different depending on types of rotating tools, the rotating tools have moments of inertia with various magnitudes.

CITATION LIST

Patent Literature

[Patent Literature 1]
Japanese Unexamined Patent Application Publication No. 2007-275999

SUMMARY OF INVENTION

Technical Problem

A reaction applied to a user at the time of braking is larger when a moment of inertia of an attached rotating tool is larger. For this reason, if a braking force is large in a configuration in which constant braking is performed independently of a moment of inertia of a rotating tool, when a rotating tool with a large moment of inertia is attached, there is a problem in that a large reaction is applied to the user at the time of braking and thus operability deteriorates. Furthermore, if a braking force is small, there is a problem in that, when a rotating tool with a small reaction and a small moment of inertia is attached, rotation of a rotating tool cannot stop quickly and thus operability deteriorates.

The present invention was made in view of such circumstances, and the present invention is for the purpose of providing an electric tool with good operability which can change a braking force in accordance with a working state.

Solution to Problem

An aspect of the present invention is an electric tool. The electric tool includes: a motor; a rotating tool driven by the motor; and a control unit configured to control at least braking of the motor, wherein the control unit sets a braking force at the time of braking in accordance with a moment of inertia of the rotating tool.

The control unit may determine the moment of inertia of the rotating tool on the basis of a rate of change with respect to time of the rotation rate at the time of acceleration or deceleration of the motor.

The electric tool includes: a manipulation switch configured to switch between driving and stopping of the motor, wherein the control unit may determine the moment of inertia of the rotating tool on the basis of a rate of change with respect to time of the rotation rate of the motor in a prescribed period of time starting after the manipulation switch has been turned off.

The control unit may not perform setting of the braking force according to the moment of inertia of the rotating tool when the rotation rate of the motor in the prescribed period of time is a prescribed value or less.

The control unit may change the braking force at the time of braking by changing a duty ratio of an on period of time of switching elements turned on for the purpose of performing electrical braking.

The control unit may change the braking force at the time of braking by changing the number of switching elements turned on for the purpose of performing electrical braking.

The electric tool includes: first and second braking means, wherein the control unit may change the braking force at the time of braking according to whether the second braking means is used.

The first braking means may come into contact with and apply a load to a rotation transmission path of the motor and the rotating tool to generate a mechanical braking force.

In the motor, at least a part thereof may have a rotor formed of a magnetic body and the second braking means may generate an electrical braking force by rotating the rotor.

The control unit may not perform setting of the braking force in accordance with the moment of inertia of the rotating tool when the load is a prescribed value or more.

When the moment of inertia of the rotating tool is a prescribed value or more, the control unit may reduce the braking force as compared with when the moment of inertia is less than a prescribed value.

The motor may be a brushless motor and the control unit may control the switching elements to control driving of the brushless motor.

The motor may have braking coils and the control unit may generate the braking force by forming a closed circuit to include the braking coils and the motor at the time of braking.

A plurality of braking coils may be provided and the control unit may change the braking force by changing the number of braking coils through which a current flows.

Note that any combinations of the above-described constituent elements and expressions obtained by converting expression of the present invention in methods, systems, or the like are effective as aspects of the present invention.

Advantageous Effects of Invention

According to the present invention, an electric tool with good operability which can change a braking force in accordance with a working state can be provided.

BRIEF DESCRIPTION OF DRAWINGS

FIG. 2 is a side cross-sectional view when the manipulation switch 5 of the grinder 1 is turned on.

FIG. 8 is a side cross-sectional view when the manipulation switch 5 of the grinder 1A is turned on.

DESCRIPTION OF EMBODIMENTS

Hereinafter, preferred embodiments of the present invention will be described in detail with reference to the drawings. Note that the same or equivalent constituent elements, members, process, and the like shown in the drawings are denoted with the same reference numerals and repeated descriptions thereof will be appropriately omitted. Furthermore, embodiments do not limit the invention and are merely examples. In addition, all of the features and combinations thereof described in the embodiments are not necessarily essential to the invention.

Embodiment 1

Figure 1:
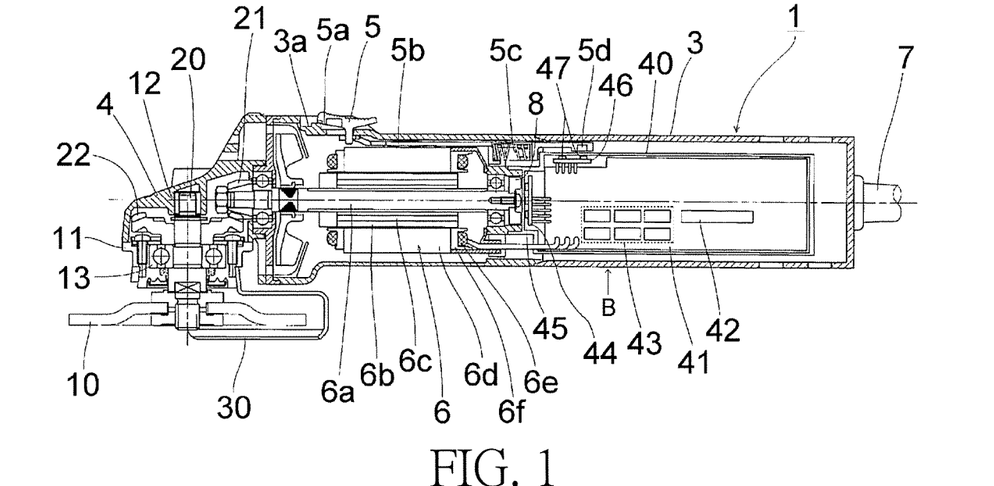
FIG. 1 is a side cross-sectional view when a manipulation switch 5 of a grinder 1 related to Embodiment 1 of the present invention is turned off.
Figure 2:
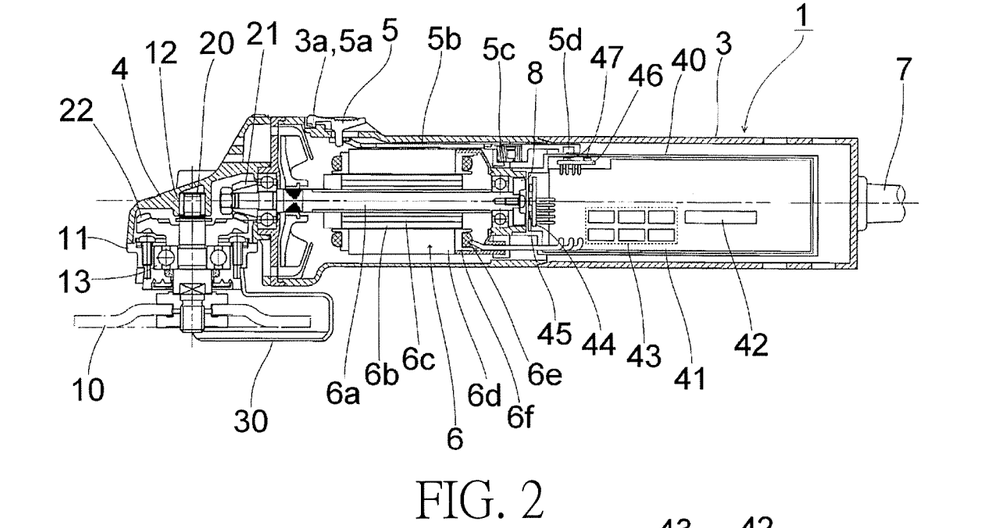
Figure 3A:
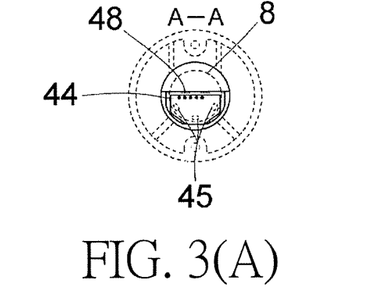
FIG. 3(A) is a cross-sectional view taken along line A-A of FIG. 3(B).
Figure 3B:
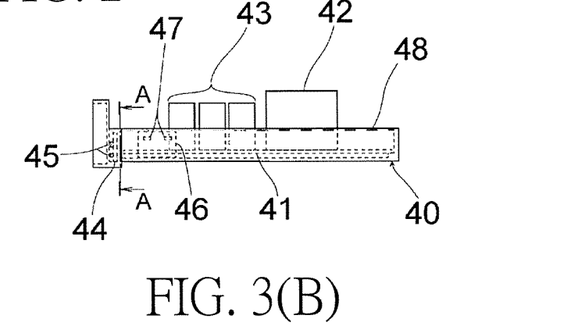
FIG. 3(B) is a diagram viewed in a direction of an arrow when a controller box 40 of FIG. 1 is viewed from a B direction.

FIG. 1 is a side cross-sectional view when a manipulation switch 5 of a grinder 1 related to Embodiment 1 of the present invention is turned off. FIG. 2 is a side cross-sectional view when the manipulation switch 5 of the grinder 1 is turned on. FIG. 3(A) is a cross-sectional view taken along line A-A of FIG. 3(B). FIG. 3(B) is a diagram viewed in a direction of an arrow when a controller box 40 of FIG. 1 is viewed from a B direction.

As shown in FIG. 1, the grinder 1 includes a whetstone 10 serving as a rotating tool and is used for a grinding task and the like configured to flatten a surface of concrete, stone, or the like. Note that a circular disc-shaped brush, cutter, or the like can also be attached as a rotating tool in addition to a circular disc-shaped grinding whetstone or cutting whetstone. The grinder 1 includes a housing 3 (which is made of, for example, a resin) and a gear case 4.

The housing 3 has a substantially cylindrical shape as a whole and an electric motor 6 serving as a motor is accommodated inside the housing 3. The electric motor 6 is connected to an external alternating current (AC) power supply such as a commercial power supply via a power cord 7 drawn from a rear end of the housing 3. A first bevel gear 21 is provided in a front end portion of an output shaft 6a of the electric motor 6. A manipulation switch (a trigger switch) 5 configured to switch supply of electricity to the electric motor 6 on/off is provided in the housing 3. The manipulation switch 5 is biased rearward (in a direction in which it is turned off) by a spring 5c, but a locking projection 5a is hooked to a locking recess 3a of the housing 3 as shown in FIG. 2 by causing the manipulation switch 5 to slide forward so that the manipulation switch 5 can be locked in an on state.

The gear case 4 is made of, for example, a metal such as an aluminum alloy and is attached to a front end portion of the housing 3. An opening of the gear case 4 is blocked by a packing gland 11 serving as a lid member. The packing gland 11 is fixed to the gear case 4 using, for example, screws or the like. The packing gland 11 is a holding member configured to hold a wheel guard 30 which will be described later. Two bearings (a needle bearing 12 and a ball bearing 13) are provided inside the gear case 4 and a spindle 20 is rotatably held by the bearings. The spindle 20 is orthogonal to the output shaft 6a of the electric motor 6 and one end thereof passes through the packing gland 11 and protrudes to an outside. On the other hand, a second bevel gear 22 engaging with the first bevel gear 21 attached to the output shaft 6a of the electric motor 6 is provided on (attached to) the other end of the spindle 20 located inside the gear case 4. In the case of rotation of the electric motor 6, a direction of rotation thereof is changed by 90 degrees through the first bevel gear 21 and the second bevel gear 22, a rotational speed thereof decreases, and the force thereof is transferred to the spindle 20. In other words, the spindle 20 is rotatably driven using the electric motor 6.

The whetstone 10 is fixed to the spindle 20 using wheel washers and lock nuts and integrally rotates with the spindle 20. If the manipulation switch 5 provided in the housing 3 is manipulated, power is supplied to the electric motor 6 and the output shaft 6a of the electric motor 6 rotates. Thus, the spindle 20 joined to the output shaft 6a via the first bevel gear 21 and the second bevel gear 22 rotates and the whetstone 10 fixed to the spindle 20 rotates. The wheel guard 30 covering at least ½ or more of an outer circumference of the whetstone 10 is attached to the packing gland 11. The wheel guard 30 can be subjected to rotation restriction so that its turning position does not change while working and changes its turning position according to work details if the rotation restriction is released.

The electric motor 6 is a brushless motor in this embodiment and a rotor core 6b made of a magnetic body integrally rotating with the output shaft 6a is provided near the output shaft 6a. A plurality of (for example, four) rotor magnets 6c are inserted into the rotor core 6b and held. A stator core 6d is provided near the rotor core 6b (is fixed to the housing 3). A stator coil 6e is provided on the stator core 6d with an insulator 6f therebetween.

A controller box 40 is provided behind the electric motor 6 inside the housing 3. A main board 41, a sensor board 44, and a switch board 46 are accommodated in the controller box 40 and the controller box 40 is filled with a urethane 48 as shown in FIGS. 3(A) and 3(B). A diode bridge 42, an inverter circuit 43, a controller 54 shown in FIG. 4, and the like are provided in the main board 41. The sensor board 44 faces a sensor magnet 8 provided on a rear end portion of the output shaft 6a of the electric motor 6. Three Hall integrated circuits (ICs) (magnetic sensors) 45 are provided on a facing surface of the sensor board 44 with respect to the sensor magnet 8, for example, at 60° intervals. A magnetic field occurring at the sensor magnet 8 is detected by the Hall ICs 45 so that a rotational position (a rotor position) of the electric motor 6 can be detected. The switch board 46 faces a switch magnet 5d provided on a distal end of a slide bar 5b sliding in cooperation with manipulation of the manipulation switch 5. Two Hall ICs (magnetic sensors) 47 are provided on a facing surface of the switch board 46 with respect to the switch magnet 5d. The switch magnet 5d directly faces any of the Hall ICs 47 in response to turning on/off of the manipulation switch 5.

Figure 4:
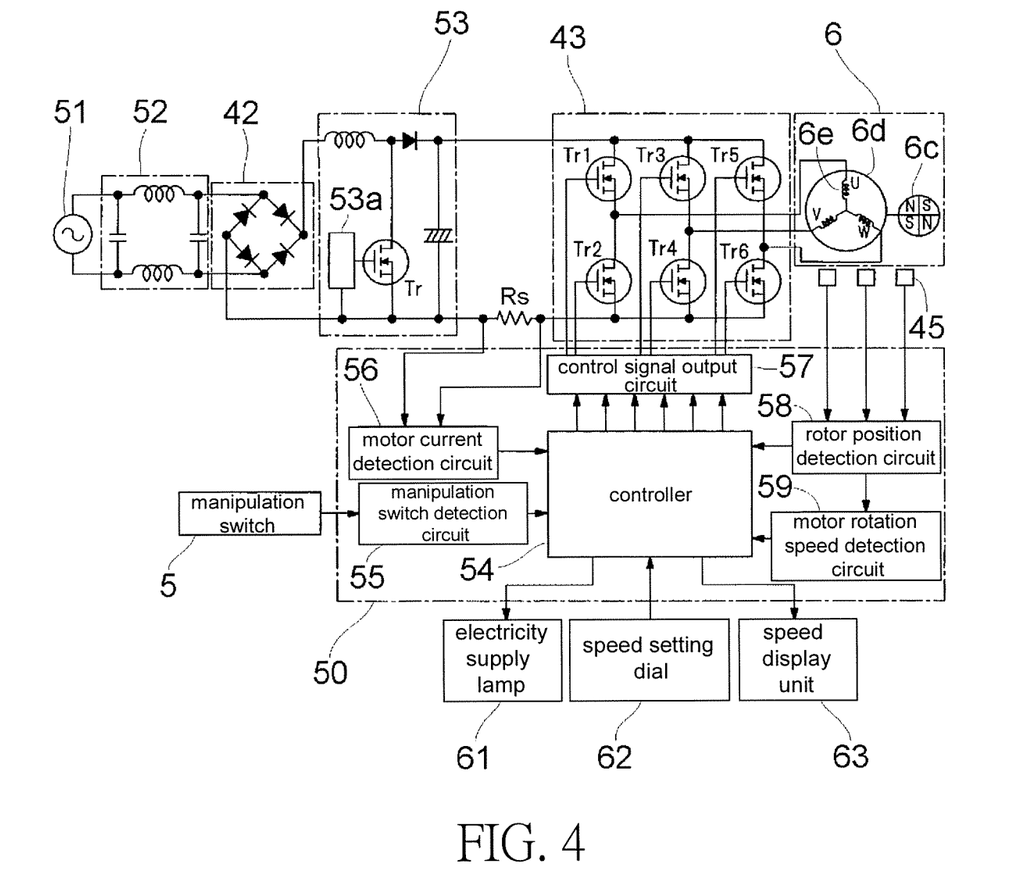
FIG. 4 is a control block diagram of the grinder 1.

FIG. 4 is a control block diagram of the grinder 1. The diode bridge 42 is connected to an AC power supply 51 via a filter circuit 52 for controlling noise. The inverter circuit 43 is provided on an output terminal of the diode bridge 42 via a power factor improvement circuit 53. The power factor improvement circuit 53 includes, for example, a transistor Tr constituted of a metal-oxide-semiconductor field-effect transistor (MOSFET) and a gate driver IC 53a configured to output a pulse-width modulation (PWM) control signal to a gate of the transistor Tr and functions to minimize harmonic currents occurring in switching elements of the inverter circuit 43 to a limit value or less. The inverter circuit 43 is, for example, obtained by performing three-phase bridge connection on switching elements Tr1 to Tr6 constituted of MOSFETs and supplies a driving current to the electric motor 6. A detection resistor Rs converts a current flowing through the electric motor 6 into a voltage.

In FIG. 4, a manipulation switch detection circuit 55 corresponds to the two Hall ICs 47 mounted on the switch board 46 of FIG. 1 and transmits a switch manipulation detection signal to the controller 54 in accordance with a position (turning on/off) of the manipulation switch 5. A controller 54 turns on an electricity supply lamp 61 if it is detected that the manipulation switch 5 is turned on through a switch manipulation detection signal. A motor current detection circuit 56 determines a current flowing through the electric motor 6 on the basis of a terminal voltage of the detection resistor Rs and transmits a motor current detection signal to the controller 54. A control signal output circuit (a gate driver IC) 57 applies a driving signal such as a PWM signal to gates of switching elements constituting the inverter circuit 43 in response to control of the controller 54.

A rotor position detection circuit 58 detects a rotational position of a rotor of the electric motor 6 on the basis of output signals of the Hall ICs 45 and transmits a rotor position detection signal to the controller 54 and a motor rotation speed detection circuit 59. The motor rotation speed detection circuit 59 detects the rotation rate of the electric motor 6 on the basis of the rotor position detection signal from the rotor position detection circuit 58 and transmits a motor rotation number detection signal to the controller 54. The controller 54 controls a control signal output circuit 57 in accordance with a switch manipulation detection signal, a motor current detection signal, the rotor position detection signal, and a motor rotation number detection signal, and a position of a speed setting dial 62, drives switching elements constituting the inverter circuit 43, and rotatably drives the electric motor 6. The controller 54 notifies a user of a rotational speed of the electric motor 6 through a speed display unit 63.

When braking is performed in the grinder 1, electrical braking (an electric brake) can be used. To be specific, in FIG. 4, a control unit 50 can turn off switching elements Tr1, Tr3, and Tr5 at a high side and turn on at least one of switching elements Tr2, Tr4, and Tr6 at a low side among a plurality of switching elements constituting the inverter circuit 43 to perform electrical braking. For example, if the switching element Tr2 at the low side is turned on, a closed circuit obtained by connecting a gland, the switching element Tr2, a U-phase winding and a V-phase winding of the stator coil 6e, and the gland is formed, power occurring due to rotation of a rotor core 6b is consumed in the closed circuit, and thus the rotation of the rotor core 6b can be decelerated. The switching element Tr2 is turned on/off due to a PWM signal and thus an electrical braking force at this tune can change the switching element Tr2 in accordance with a duty ratio of an on period of time. A braking force becomes larger when the duty ratio of the on period of time becomes larger. Furthermore, the electrical braking force can be changed in accordance with the number of switching elements which are turned on at the time of braking among the switching elements Tr2, Tr4, and Tr6 at the low side and a braking force becomes larger when the number of switching elements which are turned on becomes larger. The control unit 50 can generate any braking force using a combination of the number of switching elements which is turned on at the time of braking among the switching elements Tr2, Tr4, and Tr6 at the low side and the duty ratio of the on period of time.

Figure 5:
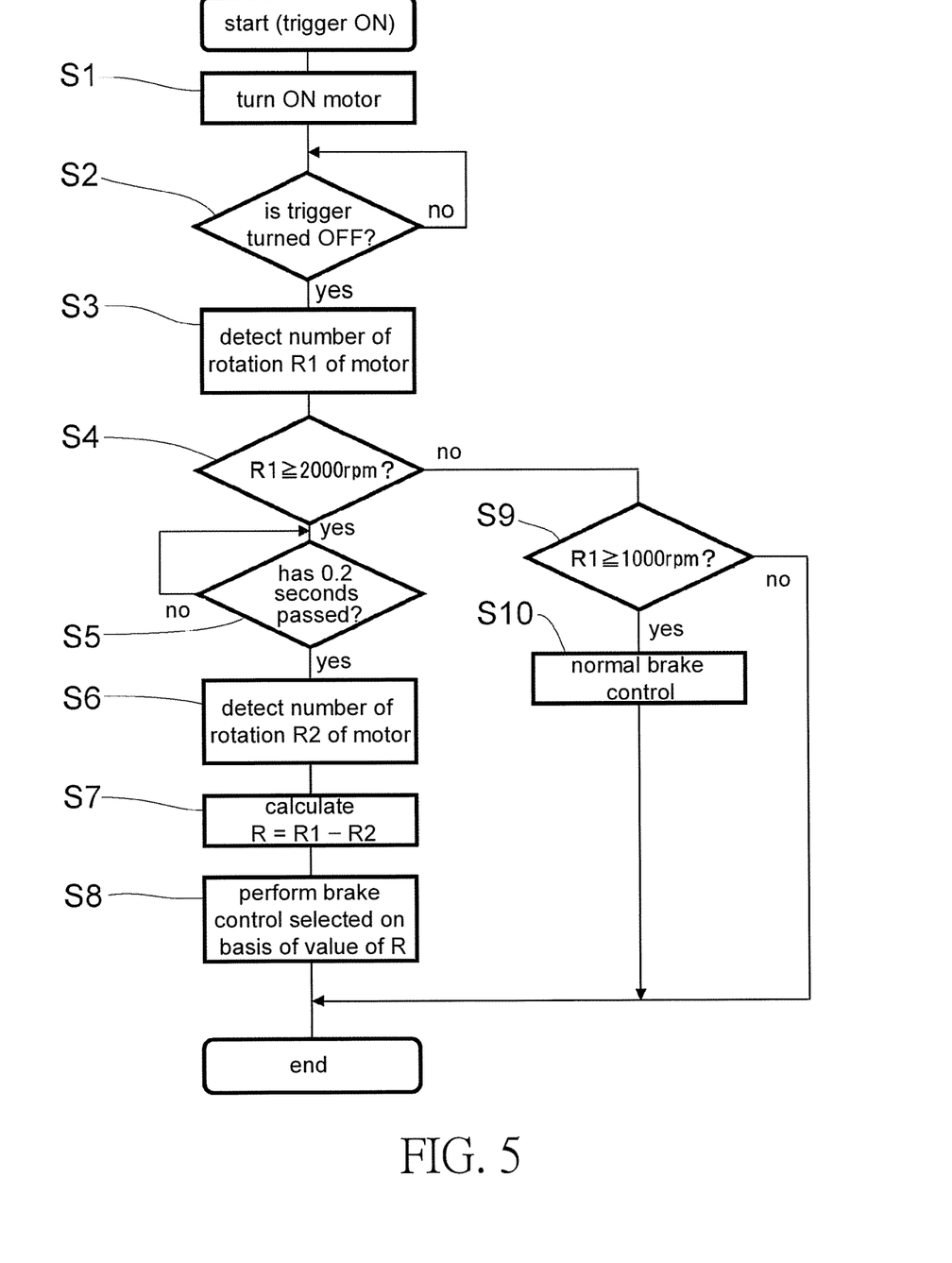
FIG. 5 is a first control flowchart of the grinder 1.

FIG. 5 is a first control flowchart of the grinder 1. The control unit 50 activates the electric motor 6 if the manipulation switch 5 is turned on (S1) and continues to drive the electric motor 6 until the manipulation switch 5 is turned off (NO in S2). The control unit 50 detects the rotation rate R1 of the electric motor 6 (S3) if the manipulation switch 5 is turned off (YES in S2). If the rotation rate R1 is a prescribed value (for example, 2000 rpm) or more (YES in S4), the control unit 50 waits for a prescribed period of time (for example, 0.2 seconds) (S5), detects the rotation rate R2 of the electric motor 6 (S6), and calculates a difference between the numbers of rotations R1 and R2 (R=R1−R2) (S7). The rotation number difference R corresponds to a rate of change with respect to time of the rotation rate at the time of deceleration of the electric motor 6 and is smaller when a moment of inertia of a rotating tool attached to an electric tool 1 is larger. Thus, the control unit 50 can determine the moment of inertia of the rotating tool on the basis of the rotation number difference R. The control unit 50 sets a braking force in accordance with the rotation number difference R calculated in Step S7, that is, the moment of inertia, and performs braking (S8). At this time, the control unit 50 sets a braking force to be smaller when the rotation number difference R is smaller, that is, the moment of inertia, is larger. A magnitude of the braking force is set to at least two levels and is set to three levels or more if necessary. The control unit 50 determines whether the rotation rate R1 is 1000 rpm or more (S9) when the rotation rate R1 of the electric motor 6 is less than 2000 rpm in Step S4 (NO in S4). The control unit 50 performs normal brake control independently of the moment of inertia (S10) if the rotation rate R1 is 1000 rpm or more (YES in S9). The braking force in the brake control herein may be one among braking forces which can be selected in Step S8 and may be a braking force which is selected in advance separately from these. The control unit 50 does not perform braking if the rotation rate R1 is less than 1000 rpm (NO in S9). In this case, the electric motor 6 stops due to natural deceleration.

Figure 6:
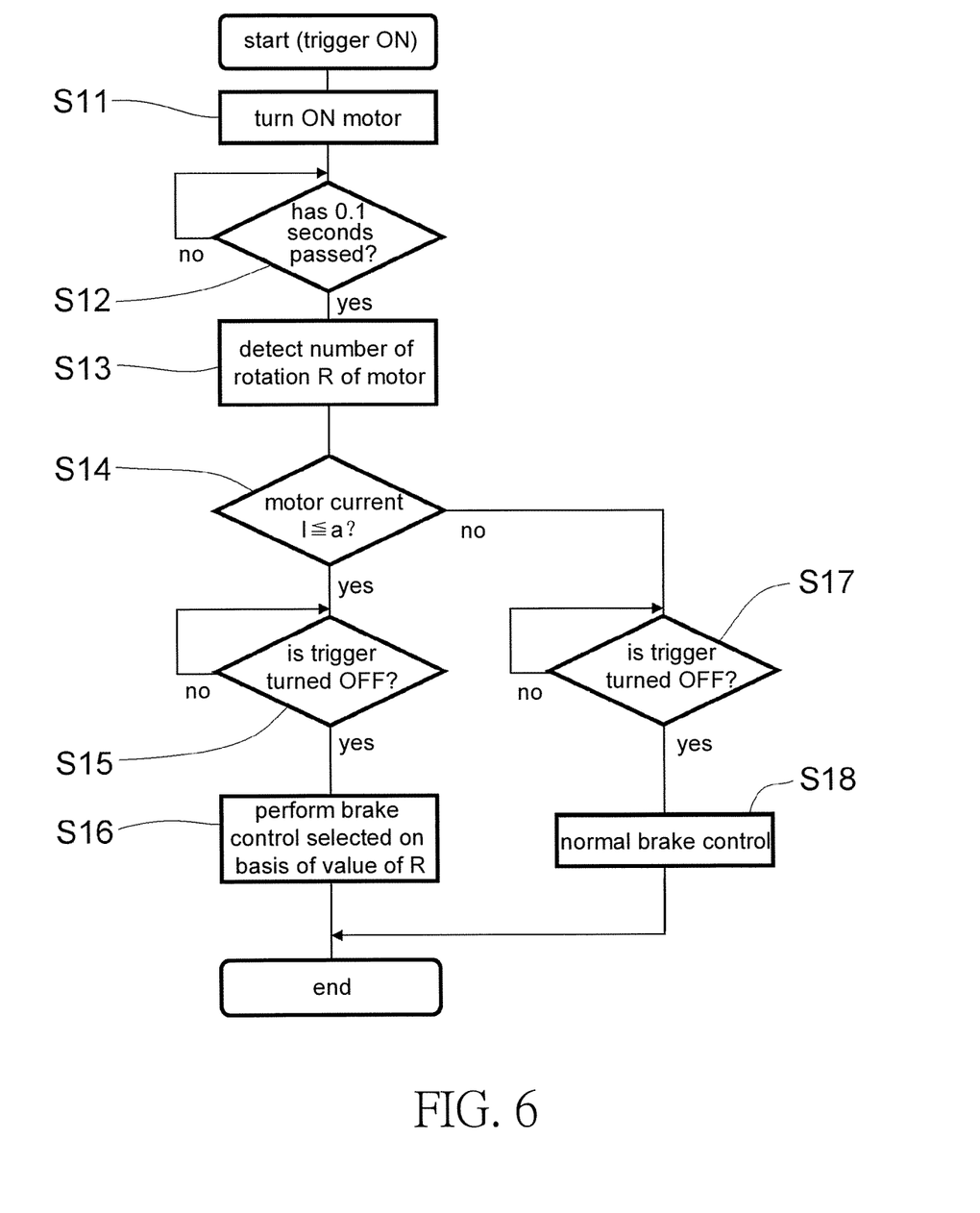
FIG. 6 is a second control flowchart of the grinder 1.

FIG. 6 is a second control flowchart of the grinder 1. While the moment of inertia is determined in accordance with a rate of change of the rotation rate at the time of the deceleration of the electric motor 6 in FIG. 5, the moment of inertia is determined in accordance with a rate of change of the rotation rate at the time of acceleration (activation) of the electric motor 6 in FIG. 6. The control unit 50 activates the electric motor 6 if the manipulation switch 5 is turned on (S11). The control unit 50 detects the rotation rate R of the electric motor 6 (S13) after a prescribed time (for example, 0.1 seconds) has passed from the activation of the electric motor 6 (S12). The rotation rate R corresponds to a rate of change with respect to time of the rotation rate at the time of the acceleration of the electric motor 6 and is smaller when the moment of inertia of the rotating tool attached to the electric tool 1 is larger. Thus, the control unit 50 can determine the moment of inertia of the rotating tool on the basis of the rotation rate R. The control unit 50 continues to drive the electric motor 6 until the manipulation switch 5 is turned off (NO in S15) if a motor current I does not exceed a prescribed value a when the rotation rate R has been detected (YES in S14), and sets a braking force in accordance with the rotation rate R detected in Step S13, that is, the moment of inertia if the manipulation switch 5 is turned off (YES in S15) and performs braking (S16). If the motor current I exceeds a prescribed value a when the rotation rate R has been detected (NO in S14), the control unit 50 performs normal brake control independently of the moment of inertia (S18) if the manipulation switch 5 is turned off (YES in S17). This is because the moment of inertia cannot be correctly determined if the motor current I exceeds a prescribed value a (NO in S14), that is, if a load is applied at the time of detecting the rotation rate R.

The controls illustrated in FIGS. 5 and 6 can be mutually combined. For example, in FIG. 5, the normal brake control independently of the moment of inertia may be performed when the rotation rate of the electric motor 6 at the time of starting braking is 2000 rpm or less and braking may not be performed when the rotation rate of the electric motor 6 is less than 1000 rpm. In addition, such control may be incorporated into the control described in FIG. 6. Furthermore, in FIG. 6, the normal brake control independently of the moment of inertia may be performed when the motor current at the time of detecting the rotation rate exceeds a prescribed value. In addition, such control may be incorporated into the control described in FIG. 5.

According to this embodiment, the following effects can be accomplished.

(1) The control unit 50 is configured to set the braking force at the time of braking in accordance with the moment of inertia of the attached rotating tool. To be specific, the braking force is set to be smaller when the moment of inertia is larger. Thus, the control unit 50 can prevent a large reaction from being applied to the user at the time of braking when a rotating tool with a large moment of inertia is attached in contrast with a configuration in which constant braking is performed independently of the moment of inertia of the rotating tool and thus operability becomes better. Furthermore, a braking force is set in accordance with the moment of inertia of the attached rotating tool. Thus, looseness of wheel nuts used to fix the rotating tool to the spindle 20 at the time of braking can be minimized. For this reason, separate bolts or the like need not be provided to prevent the looseness of the wheel nuts, which is advantageous in reducing the number of parts.

(2) The control unit 50 determines the moment of inertia in accordance with the rate of change of the rotation rate at the time of acceleration or deceleration of the electric motor 6. Thus, a configuration of rotation number monitoring which is normally performed can also be used for determining the moment of inertia and thus a circuit configuration for determining the moment of inertia is easily accomplished.

(3) When the rotation rate of the electric motor 6 at the time of starting braking is a prescribed value (for example, 2000 rpm) or less, a reaction at the time of braking is small. Thus, the normal brake control independently of the moment of inertia is performed and control is simplified as compared with when a moment of inertia is determined at all times independently of the rotation rate of the electric motor 6 and a braking force is set. In addition, when the rotation rate of the electric motor 6 is less than a prescribed value (for example, 1000 rpm), braking is not performed even if the manipulation switch 5 is turned off. Thus, control is simplified as compared with when braking is performed at all times if the manipulation switch 5 is turned off.

Embodiment 2

Figure 7:
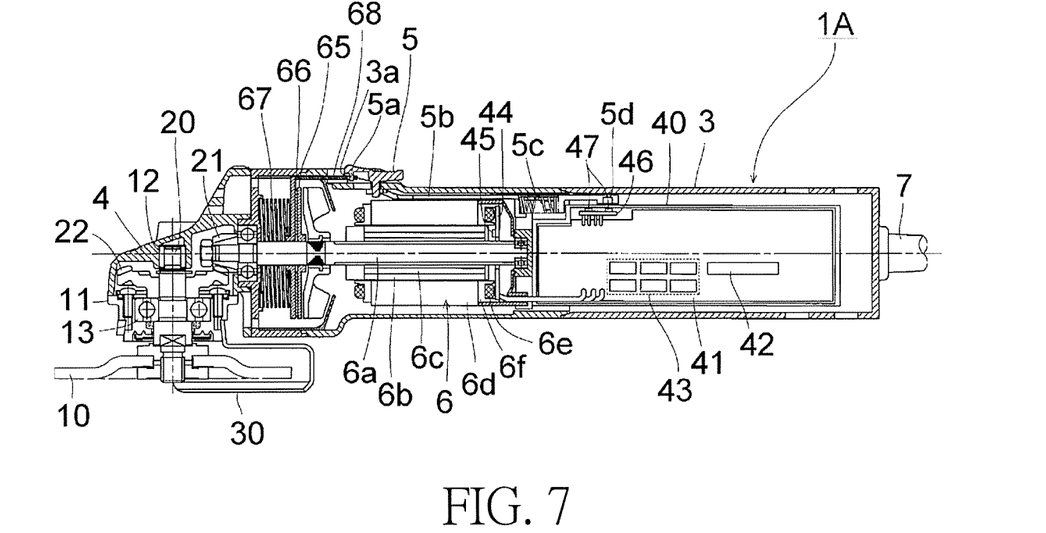
FIG. 7 is a side cross-sectional view when a manipulation switch 5 of a grinder 1A related to Embodiment 2 of the present invention is turned off.
Figure 8:
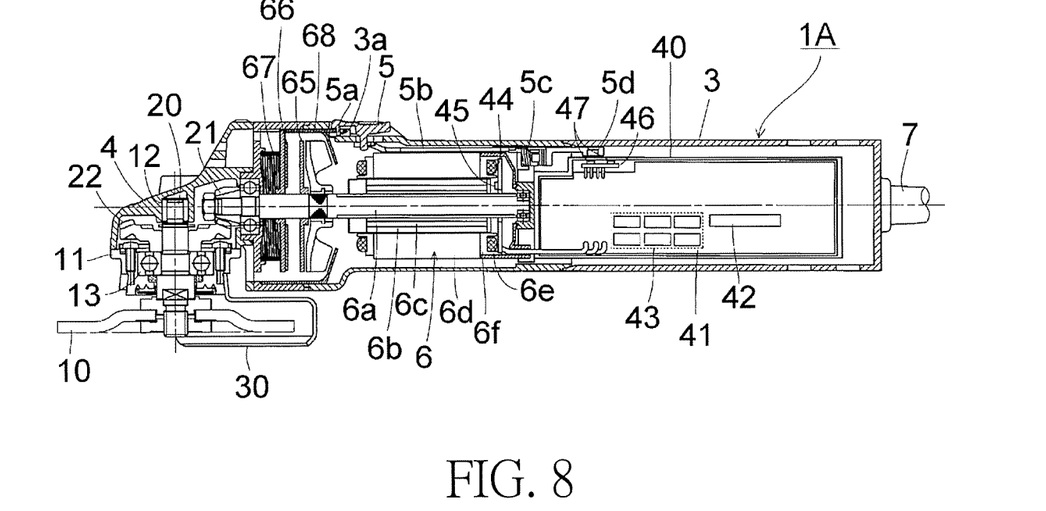

FIG. 7 is a side cross-sectional view when a manipulation switch 5 of a grinder 1A related to Embodiment 2 of the present invention is turned off. FIG. 8 is a side cross-sectional view when the manipulation switch 5 of the grinder 1A is turned on. Unlike that of Embodiment 1, the grinder 1A includes a mechanical braking force generating means serving as a first braking means in addition to an electrical braking force generating means serving as a second braking means. Furthermore, a sensor board 44 is provided in an electric motor 6 side inside a controller box 40 and Hall ICs 45 above the sensor board 44 detect a magnetic field occurring due to a rotor magnet 6c which faces the sensor board 44 to detect a rotational position of the electric motor 6. The mechanical braking force generating means includes a brake rotor 65 and a brake pad 66. The brake rotor 65 is provided in front of the electric motor 6 and integrally rotates with an output shaft 6a of the electric motor 6. The brake pad 66 is provided in front of the brake rotor 65 and faces the brake rotor 65. The brake pad 66 is biased rearward by a spring 67, the brake pad 66 comes in surface contact with the brake rotor 65 and thus a load is applied to the brake rotor 65 as shown in FIG. 7 when the manipulation switch 5 is at an off position, and a mechanical braking force is generated. On the other hand, if the manipulation switch 5 is slid to a on position, the brake pad 66 moves forward against the biasing of the spring 67 due to a slide bar 68 sliding in cooperation with the sliding of the manipulation switch 5 and faces the brake rotor 65 in a non-contact manner as shown in FIG. 8, and thus a mechanical braking force is not generated. If the manipulation switch 5 is turned off in this embodiment, a mechanical braking force is generated at all times independently of a moment of inertia and the rotation rate of the electric motor 6. A braking force can be changed in accordance with whether an electrical braking force is used in addition to the mechanical braking force or a magnitude of the electrical braking force. The magnitude of the electrical braking force can be set to the flow illustrated in FIG. 5 or 6. Other aspects of this embodiment are the same as those of Embodiment 1 and can accomplish the same effects.

Embodiment 3

Figure 9:
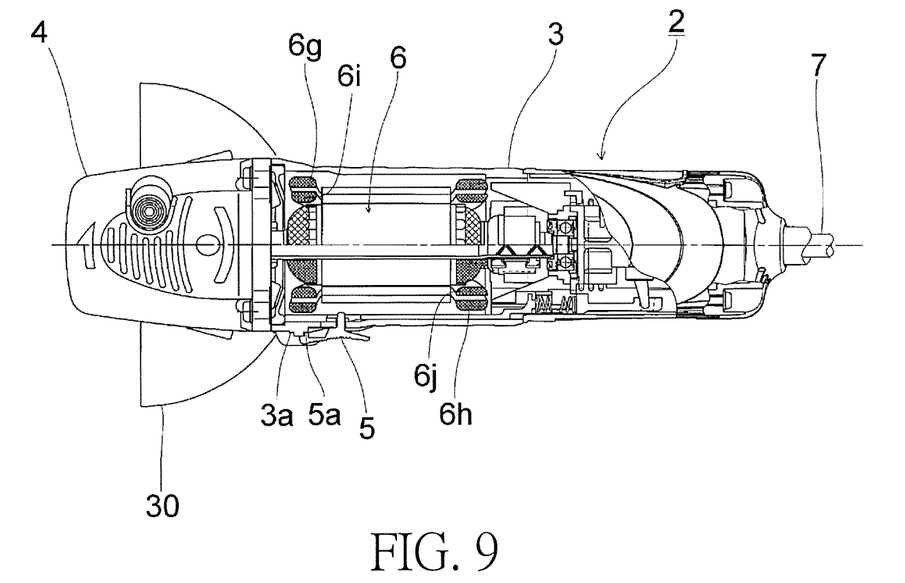
FIG. 9 is a plane cross-sectional view of a grinder 2 related to Embodiment 3 of the present invention.
Figure 10:
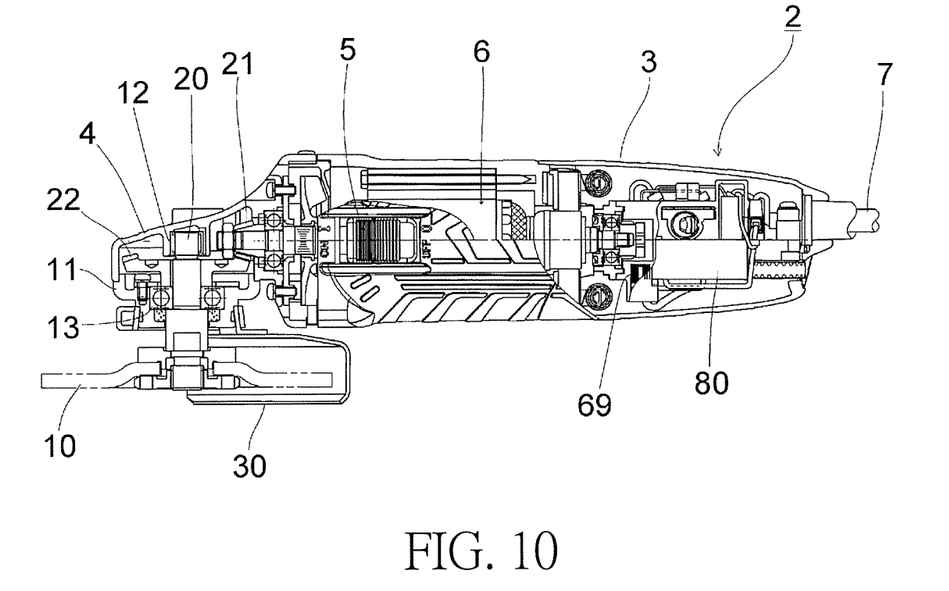
FIG. 10 is a side cross-sectional view of the grinder 2.
Figure 11:
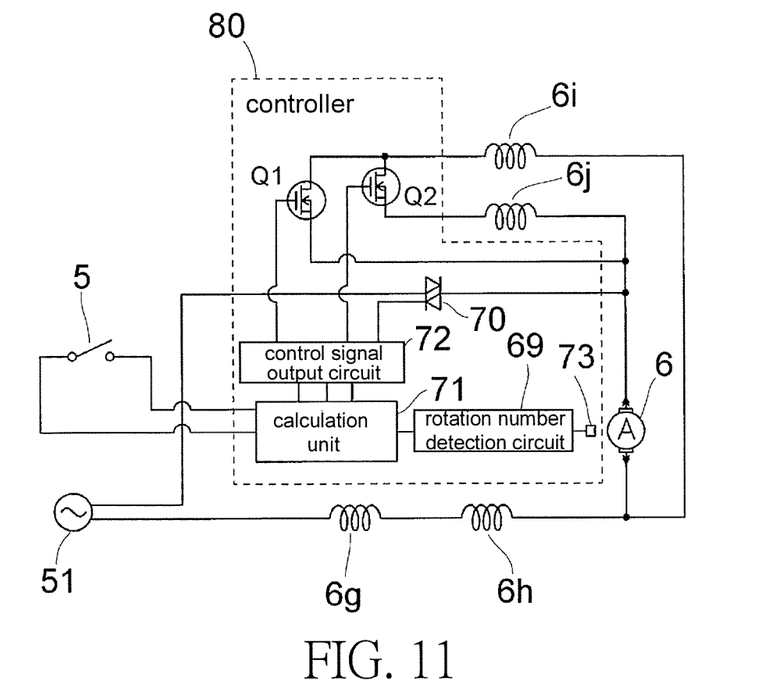
FIG. 11 is a control block diagram of the grinder 2.

FIG. 9 is a plane cross-sectional view of a grinder 2 related to Embodiment 3 of the present invention. FIG. 10 is a side cross-sectional view of the grinder 2. FIG. 11 is a control block diagram of the grinder 2. The grinder 2 is different from that of Embodiment 1 and an electric motor 6 is a motor with a brush. The electric motor 6 includes stator coils 6g and 6h and brake coils (braking coils) 6i and 6j. The brake coils 6i and 6j are braking coils of the electric motor 6. In a controller 80 of FIG. 11, if the manipulation switch 5 is turned on, a calculation unit 71 controls a control signal output circuit 72, applies a driving signal (for example, a PWM signal) to a gate of a triac 70 serially connected to the electric motor 6, and rotatably drives the electric motor 6. A rotation number detection circuit 69 detects the rotation rate of the electric motor 6 through output signals of Hall ICs (magnetic sensors) 73 and performs a feedback on the calculation unit 71. The calculation unit 71 turns on any of switching elements Q1 and Q2 constituted of, for example, MOSFETs so that a closed circuit including the brake coils 6i and the electric motor 6, or the brake coils 6i and 6j and the electric motor 6 is formed and the electric motor 6 can be braked. To be specific, if the switching element Q1 is turned on, a closed circuit obtained by connecting the switching element Q1, the brake coil 6i, the electric motor 6, and the switching element Q1 is formed and a small braking force is generated. If the switching element Q2 is turned on, a closed circuit obtained by connecting the switching element Q2, the brake coil 6i, the electric motor 6, the brake coil 6j, and switching element Q2 is formed and a large braking force is generated. A circuit configuration in which the numbers of turns of the brake coils 6i and 6j are mutually different and the brake coil 6j can be provided in the closed circuit at the time of braking without providing the brake coil 6i may be provided. In addition, the braking force can be set to three levels.

In this embodiment, after the manipulation switch 5 is turned off, the switching element Q1 is turned on, a moment of inertia of a rotating tool is determined while a weak brake is applied and a setting of the braking force is reflected. Braking is performed immediately after the manipulation switch 5 has been turned off because a current escapes in a short period of time if the electric motor 6 is open. Thus, a regenerative circuit cannot manipulate. Hereinafter, a manipulation thereof will be described in detail. If the manipulation switch 5 is turned off, the calculation unit 71 transmits a control signal (an off signal) to the gate of the triac 70 and cuts off a current from an AC power supply 51. The switching element Q1 is simultaneously turned on and a closed circuit obtained by connecting the brake coil 6i and the electric motor 6 is constituted. Thus, a weak brake with only the brake coil 6i is applied and the calculation unit 71 determines the moment of inertia of the rotating tool in the interval. Furthermore, the braking force is changed by selecting whether one brake coil is used, two brake coils are used, or a brake coil is not used in accordance with the moment of inertia. Other aspects of this embodiment are the same as those of Embodiment 1 and can accomplish the same effects.

Figure 12:
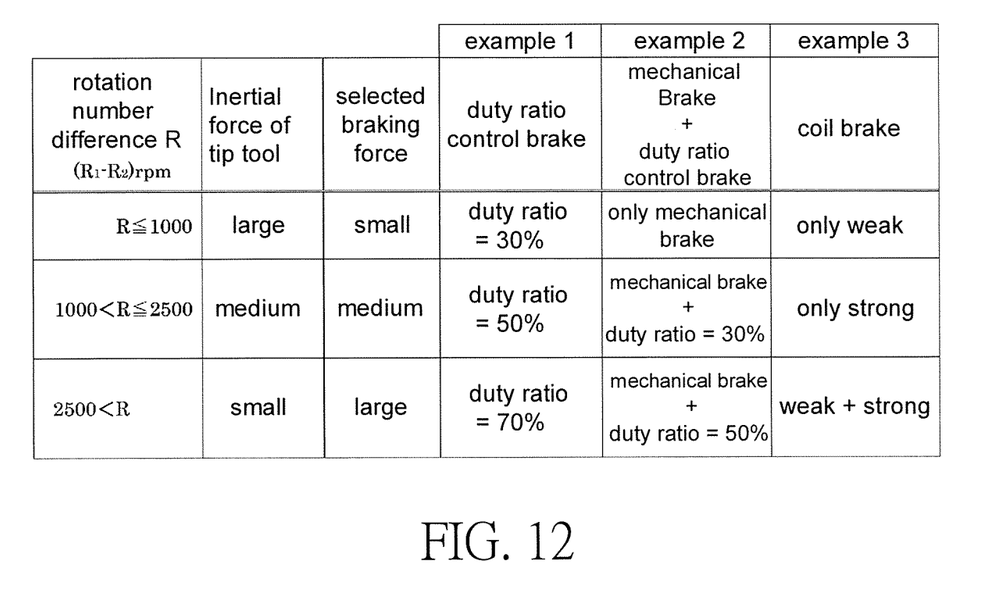
FIG. 12 is a table in which settings of braking forces in embodiments are collected.

FIG. 12 is a table in which settings of braking forces in embodiments are collected. In the table, rotation number differences R correspond to rates of change of the rotation rate of an electric motor 6. In the example of this table, the rotation number differences R are divided into three levels such as 1000 rpm or less, more than 1000 rpm and 2500 rpm or less, and more than 2500 rpm and moments of inertia of an attached rotating tool and brake forces to be selected are divided into three levels such as large, medium, and small. Example 1 illustrated in this table corresponds to Embodiment 1 and is an example in which a braking force is changed using a duty ratio of an on period of time of switching elements at a low side of an inverter circuit configured to supply electricity to a brushless motor. Example 2 corresponds to Embodiment 2 and an example in which a mechanical braking force generating means is provided in addition to an electrical braking force generating means. Example 3 corresponds to Embodiment 3 and generates braking forces with three levels using three states such as usage of only a brake coil for generating a weak braking force, usage of only a brake coil for generating a strong braking force, and usage of both of the brake coils.

Although the present invention has been described above using the embodiments as examples, it can be understood by those skilled in the art that various modifications can be performed on constituent elements and processing processes of the embodiments within the scope disclosed in the claims. Hereinafter, modified examples will be mentioned.

An electric tool is not limited to a grinder and may be one of other types of electric tool, such as, for example, circular saws, concrete cutters, bush cutters, and lawnmowers, to which rotating tools with a different moments of inertia can be selectively attached. Parameters illustrated in the embodiments, for example, a rate of change of the rotation rate serving as a boundary of a moment of inertia determination, a waiting time at the time of determining a moment of inertia, the number of levels of a braking force, and the like are merely examples. In addition, the parameters may be arbitrarily set in accordance with an experimental or required performance.

Also, although the control unit is configured to automatically set the braking force in accordance with the moment of inertia of the rotating tool in the embodiments of the present invention, the control unit may be an electric tool configured such that an operator determines a moment of inertia of a rotating tool to be used and manipulates a braking force selecting switch so that a signal is applied to a control unit, and thus the control unit sets the braking force.

The invention claimed is:

1. An electric tool comprising:
a motor;
a rotating tool driven by the motor;
an inertia detecting circuit having a rotation sensor that detects a rotation number of the motor; and
a control unit configured to control at least braking of the motor,
wherein the control unit sets a braking force at the time of braking in accordance with a moment of inertia of the rotating tool,
wherein when the moment of inertia of the rotating tool rotating at a predetermined value is a prescribed value or more, the control unit reduces the braking force as compared with when the moment of inertia of the rotating tool rotating at the predetermined value is less than the prescribed value.

2. The electric tool according to claim 1, wherein the control unit determines the moment of inertia of the rotating tool on the basis of a rate of change with respect to time of a rotation rate obtained by a magnetic sensor at the time of acceleration or deceleration of the motor.

3. The electric tool according to claim 1, comprising:
a manipulation switch configured to switch between driving and stopping of the motor,
wherein the control unit determines the moment of inertia of the rotating tool on the basis of a rate of change with respect to time of the rotation rate of the motor in a prescribed period of time starting after the manipulation switch has been turned off.

4. The electric tool according to claim 3, wherein the control unit does not perform setting of the braking force according to the moment of inertia of the rotating tool when the rotation rate of the motor in the prescribed period of time is a prescribed value or less.

5. The electric tool according to claim 1, wherein the control unit changes the braking force at the time of braking by changing a duty ratio of an on period of time of switching elements turned on for the purpose of performing electrical braking.

6. The electric tool according to claim 1, wherein the control unit changes the braking force at the time of braking by changing a number of switching elements turned on for the purpose of performing electrical braking.

7. The electric tool according to claim 1, comprising:
first and second braking means including braking coils,
wherein the control unit changes the braking force at the time of braking according to whether the second braking means is used.

8. The electric tool according to claim 7, wherein the first braking means comes into contact with and applies a load to a rotation transmission path of the motor and the rotating tool to generate a mechanical braking force.

9. The electric tool according to claim 7, wherein the motor comprises a rotor at least partially formed of a magnetic body, and the second braking means generates an electrical braking force by rotating the rotor.

10. The electric tool according to claim 1, wherein the control unit does not perform setting of the braking force in accordance with the moment of inertia of the rotating tool when a load is a prescribed value or more.

11. The electric tool according to claim 5, wherein the motor is a brushless motor and the control unit controls the switching elements to control driving of the brushless motor.

12. The electric tool according to claim 1, wherein the motor has braking coils and the control unit generates the braking force by forming a closed circuit to include the braking coils and the motor at the time of braking.

13. The electric tool according to claim 12, wherein a plurality of the braking coils are provided and the control unit changes the braking force by changing the number of the braking coils through which a current flows.

14. An electric tool comprising:
a motor;
a rotating tool driven by the motor;
a motor rotation speed detection circuit configured to detect a rotation speed of the motor;
a manipulation switch configured to operable by user; and
a control unit configured to control a driving of the motor,
wherein, the control unit is configured, when the manipulation switch is turned off while the motor is being driven, to perform a first deceleration control when the rotation speed of the motor is equal to or higher than a predetermined value and to perform a second deceleration control different from the first deceleration control when the rotation speed of the motor is lower than the predetermined value,
wherein the control unit is configured to control the motor so that a braking force generated in the first deceleration control is stronger as compared with the second deceleration control.

15. The electric tool according to claim 14, wherein the control unit is configured to change a duty ratio of an on period of time of switching elements turned on for the purpose of changing the braking force.

16. The electric tool according to claim 14, wherein the control unit is configured to change a number of switching elements turned on for the purpose of changing the braking force.

17. The electric tool according to claim 14, further comprising an inverter circuit having a plurality of switching elements, wherein the control unit changes the braking force by controlling the switching elements of the inverter circuit.

18. The electric tool according to claim 15, wherein the motor is a brushless motor and the control unit is configured to control the switching elements to control driving of the brushless motor.

19. The electric tool according to claim 14, wherein the control unit is configured to set a stronger braking force according to the rotation speed when the manipulation switch is turned off while number of revolutions of the motor is rising after the manipulation switch is turned on.

20. The electric tool according to claim 14, wherein the control unit is configured to change the braking force according to a value of a load to the motor.

21. The electric tool according to claim 14, wherein the control unit is configured to keep the first deceleration control or the second deceleration control which is selected according to the number of revolutions at the time of the manipulation switch is turned off until the motor stops.

* * * * *